US011907883B1

(12) United States Patent
Evans

(10) Patent No.: US 11,907,883 B1
(45) Date of Patent: Feb. 20, 2024

(54) SYSTEM FOR IDENTIFYING POTENTIAL LEADERS IN CORPORATE ROLES AND AN OVERALL FOUNDATION OF LEARNING PROCESS FOR IDENTIFYING POTENTIAL LEADERS IN CORPORATE ROLES

(71) Applicant: Mark Jeffrey Evans, Santa Barbara, CA (US)

(72) Inventor: Mark Jeffrey Evans, Santa Barbara, CA (US)

( * ) Notice: Subject to any disclaimer, the term of this patent is extended or adjusted under 35 U.S.C. 154(b) by 0 days.

(21) Appl. No.: 17/887,415

(22) Filed: Aug. 13, 2022

(51) Int. Cl.
*G06Q 10/0639* (2023.01)
*G06Q 10/105* (2023.01)

(52) U.S. Cl.
CPC ..... *G06Q 10/06398* (2013.01); *G06Q 10/105* (2013.01)

(58) Field of Classification Search
CPC ......... G06Q 10/0639; G06Q 10/06398; G06Q 30/0203; G06N 20/00
See application file for complete search history.

(56) References Cited

U.S. PATENT DOCUMENTS

| 10,032,385 B2 * | 7/2018 | DeFreitas | G06Q 10/06 |
| 2004/0073476 A1 * | 4/2004 | Donahue | G06Q 30/0203 705/7.32 |
| 2022/0262499 A1 * | 8/2022 | Li | G06N 3/045 |
| 2022/0270612 A1 * | 8/2022 | Ahmed | G06F 40/30 |

OTHER PUBLICATIONS

Doornenbal, Brian M. Spisak, Brian R. van der Laken, Paul A. Opening the black box: Uncovering the leader trait paradigm through machine learning. The Leadership Quarterly 33 (2022). Article available online Mar. 16, 2021 (Year: 2021).*

* cited by examiner

*Primary Examiner* — Johnna R Loftis
(74) *Attorney, Agent, or Firm* — Mark H. Plager; Stephen Hallberg; Plager Schack LLP

(57) ABSTRACT

A system for identifying potential leaders in corporate roles is disclosed. List the individual components of elements that make up the best version of your invention. This includes all steps, decisions, and any necessary physical items. Only the component itself. Number each item according to its number on any accompanying drawings.

9 Claims, 7 Drawing Sheets

SYSTEM FOR IDENTIFYING POTENTIAL LEADERS IN CORPORATE ROLES AND AN OVERALL FOUNDATION OF LEARNING PROCESS FOR IDENTIFYING POTENTIAL LEADERS IN CORPORATE ROLES

BACKGROUND

Embodiments of the invention described in this specification relate generally to leadership identification systems, and more particularly, to a system for identifying potential leaders in corporate roles and an overall foundation of learning process for identifying potential leaders in corporate roles.

It is an ongoing issue in the business world to decide the person to promote into leadership positions. This is in the broad sense, meaning any job that directs the actions of others. The biggest problem is having a more data based method of selection, as opposed to the more traditional intuitive methods most commonly used. The cost of poor selection is enormous and difficult to reconcile. The system will make those decisions more accurate and the results more profitable.

Job competency models do not cover the social engagement models of leadership. At the same time, the areas they do cover are broad and highly subjective. An example is communications skills. While an important competency overall, it is not behaviorally specific enough to inform good decision processes.

Therefore, what is needed is a better way to identify quality of leadership behaviors and, based on the behaviors exhibited, identify potential leaders in corporate roles.

BRIEF DESCRIPTION

A novel system for identifying potential leaders in corporate roles, an overall foundation of learning process for identifying potential leaders in corporate roles, a leadership survey and trait identification machine learning ("ML") process for determining whether employees are suitable for leadership roles, and a method for interacting with a system for identifying potential leaders in corporate roles configured to generate leadership surveys to use in identifying likelihood of high performance in candidates for leadership roles are disclosed.

In some embodiments, the system for identifying potential leaders in corporate roles includes performance of a comprehensive and detailed process that will produce performance predictors for employees being considered for leadership roles and will provide targeted feedback on key areas to develop, and the most pertinent areas to monitor. In some embodiments, performance of the comprehensive and detailed process by the system for identifying potential leaders in corporate roles further involves taking a research base of high performance leadership behaviors and provide a short screening questionnaire to determine the likelihood of success for that person. In some embodiments, the system for identifying potential leaders in corporate roles includes a deep learning AI system that will make the questionnaire process precise, short, and interactive. Furthermore, the system for identifying potential leaders in corporate roles of this specification provides a platform for interactive discussions and clarifications on specific performance areas, as well as reports on key trends in overall placement strategies made by a user. In this way, the system for identifying potential leaders in corporate roles will make those decisions more accurate and the results more profitable.

In some embodiments, the overall foundation of learning process for identifying potential leaders in corporate roles comprises (i) receiving data input by users (or participants, potential leaders, candidates, etc.), (ii) uniquely associating each user with a survey identification (or survey ID, also referred to by the acronym "SID" with a subscript number), (iii) associating evaluative data input by each of several raters with a unique token ID (or "TID" with a corresponding subscript number, where the SID and TID correspond in subscript number), (iv) considering the raw survey input data (e.g., $SID_1, SID_2, \ldots, SID_N$) and the evaluative data input by the raters (e.g., $TID_1, TID_2, \ldots, TID_N$) to be the overall raw data for the surveys during an unsupervised learning stage characterized by imbalanced classification where it is possible to utilize one or more machine learning algorithms (e.g., principle components algorithm, a regression analysis algorithm, a means algorithm, a nearest neighbor algorithm, etc.), (v) providing the raw data of the surveys for processing by the machine learning algorithms, (vi) creating domains of question sets for the SIDs in which each SID is taken as a unit with its question set grouping, and denoted by domain number (e.g., $D_1, D_2, \ldots, D_N$), (vii) creating traits from the question set groupings of the domains, (viii) associating the domains and traits with a same numeric subscript value (e.g., $T_1, T_2, \ldots, T_N$) during either a supervised or a semi-supervised learning stage, (ix) looking at the domains as a set, looking at the traits individually, and looking for connections via one or more of the machine learning algorithms, (x) performing one or more of the machine learning algorithms on the traits, (xi) calculating the traits into meta-factors, (xii) determining the quality of leadership behaviors for the participant, and (xiii) determining whether the participant would make a good leader or not based on a number of positive quality of leadership behaviors in which more positive quality of leadership behaviors is more indicative of good leadership potential by the participant.

In some embodiments, the leadership survey and trait identification ML process for determining whether employees are suitable for leadership roles provides steps to create, view, and train projects for assessing quality of leadership potential of participants. In some embodiments, the steps to create, view, and train projects for assessing quality of leadership potential of participants are accessed through several dashboard views comprising a monitoring dashboard, a project setup dashboard, a training dashboard, an analysis dashboard, and reporting views. In some embodiments, the monitoring dashboard provides views in which (i) a first view on site shows all active analysis with several options including at least a start/pause analysis option, a view statistics and reports option, and an add new project option, (ii) a new project view in which a user can view all assessment types and the user can select an assessment type of either multirater or individual assessment (self-assessment), and (iii) a filtering view whereby the user can filter by name if a multirater type or survey ID (SID) if individual assessment type. The monitoring dashboard also determines whether machine learning training is needed or not. In some embodiments, the project setup dashboard provides views in which (i) filtered data sets of surveys are displayed according to filter option (multirater by SID, self-assessment by token ID), and (ii) the user can add rating per existing fields. In some embodiments, the training dashboard (i) displays all possible assessment results based on the filtering from the project setup dashboard, thereby allowing individual selections and ratings to be applied to the individual selections and (ii) presents a view in which the user may select data points for analysis based on chart information that gives all traits and allows for multiple selections from the list and by individual questions response which allows for the multiple selection option. In some embodiments, the analysis dashboard (i) allows selection of the analysis method to be used based on whether it is a supervised learning, semi-supervised learning, or unsupervised learning, and (ii) enables selection of statistical method to use—both selection of the type of analysis (e.g., Bayesian, deep learning, neural network, dimensionality reduction, clustering, etc.) and selection of the method based on the type (e.g., for clustering, K-means, K-medians, expectation maximations, hierarchical clustering, etc.).

In some embodiments, the method for interacting with a system for identifying potential leaders in corporate roles configured to generate leadership surveys to use in identifying likelihood of high performance in candidates for leadership roles comprises (i) selecting, by a user interacting with the system, an option for what the user would like to do, (ii) receiving a selection of either a new estimate option, a saved estimations option, or a review past placements option based on the user's selection, (iii) when the selection is a new estimate option, inputting a name and a role for a participant, (iv) selecting one or more special requirements of the role, (v) receiving user's selection of a submission, (vi) generating a list of questions based on the user's input of role and special requirements for the role, (vii) visually outputting a questionnaire with the list of questions, (viii) generating a likelihood of high performance based on the user's input to the questionnaire, (ix) generating areas of development to monitor, and (x) enabling options for the user to save the estimate, calculate a return on investment (ROI), place the participant in the role, add the participant to a group, or start the process over.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
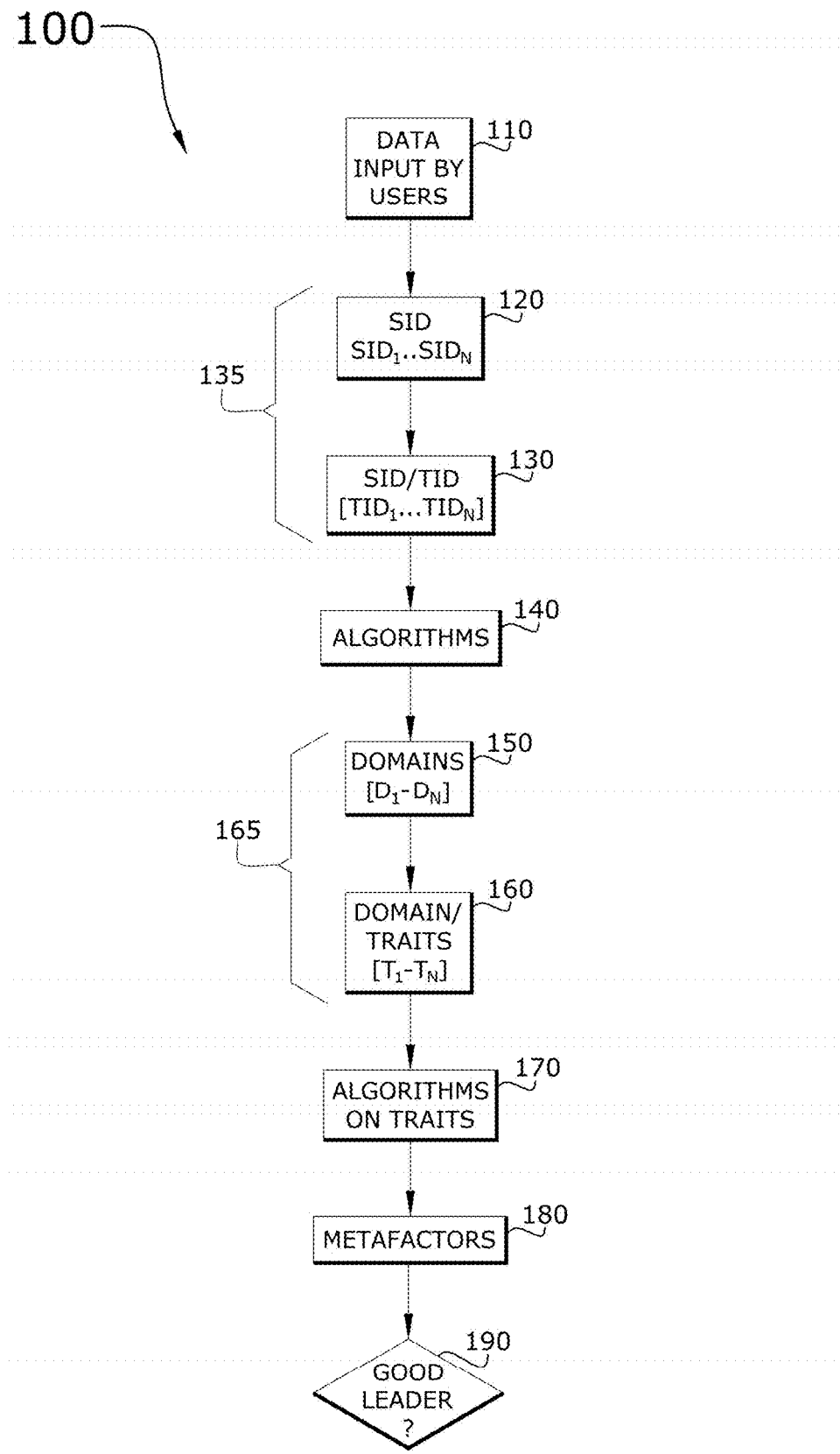
FIG. 1 conceptually illustrates an overall foundation of learning process for identifying potential leaders in corporate roles in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment", "an embodiment", or "some embodiments" is intended to indicate that a particular feature, structure, or characteristic described in connection with the embodiment or embodiments is included in at least one embodiment, and possibly multiple embodiments, of the invention. The appearances of the phrases "in one embodiment", "an embodiment", or "in some embodiments" in various places in the specification are not necessarily all referring to the same embodiment.

Throughout the drawings, reference numbers may be re-used to indicate correspondence between referenced elements. Furthermore, as used in this disclosure, except where the context requires otherwise, the term "comprise" and variations of the term, such as "comprising", "comprises", and "comprised" are not intended to exclude other additives, components, integers, or steps.

Additionally, it is noted that the embodiments may be described as a process or a method that is depicted as a flowchart, a flow diagram, a structure diagram, or a block diagram. The flowcharts and block diagrams in the figures can illustrate the architecture, functionality, and operation of possible implementations of systems, methods and computer programs/software programs according to various embodiments disclosed. In this regard, each block or each step in a flowchart or block diagram can represent a module, segment, or portion of code, that can comprise one or more executable instructions for implementing the specified logical function(s). It should also be noted that, in some alternative implementations, the functions noted in the blocks and/or steps may occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Furthermore, combinations of blocks and/or steps may be illustrated and described by reference to an underlying meaning, purpose, and/or usage of a combination of blocks/steps. For instance, in a description of the steps of an overall foundation of learning process for identifying potential leaders in corporate roles, described below by reference to FIG. 1, the reference numbering of some items refers to an intended treatment of information at runtime by the process (e.g., step 135 and step 165), but are not necessarily demonstrated as separate blocks/steps of the overall foundation of learning process.

Some embodiments of the invention include a novel system for identifying potential leaders in corporate roles, an overall foundation of learning process for identifying potential leaders in corporate roles, a leadership survey and trait identification machine learning ("ML") process for determining whether employees are suitable for leadership roles, and a method for interacting with a system for identifying potential leaders in corporate roles configured to generate leadership surveys to use in identifying likelihood of high performance in candidates for leadership roles. In some embodiments, the system for identifying potential leaders in corporate roles includes performance of a comprehensive and detailed process that will produce performance predictors for employees being considered for leadership roles and will provide targeted feedback on key areas to develop, and the most pertinent areas to monitor. In some embodiments, performance of the comprehensive and detailed process by the system for identifying potential leaders in corporate roles further involves taking a research base of high performance leadership behaviors and provide a short screening questionnaire to determine the likelihood of success for that person. In some embodiments, the system for identifying potential leaders in corporate roles includes a deep learning AI system that will make the questionnaire process precise, short, and interactive. Furthermore, the system for identifying potential leaders in corporate roles of this specification provides a platform for interactive discussions and clarifications on specific performance areas, as well as reports on key trends in overall placement strategies made by a user. In this way, the system for identifying potential leaders in corporate roles will make those decisions more accurate and the results more profitable.

In some embodiments, the overall foundation of learning process for identifying potential leaders in corporate roles comprises (i) receiving data input by users (or participants, potential leaders, candidates, etc.), (ii) uniquely associating each user with a survey identification (or survey ID, also referred to by the acronym "SID" with a subscript number), (iii) associating evaluative data input by each of several raters with a unique token ID (or "TID" with a corresponding subscript number, where the SID and TID correspond in subscript number), (iv) considering the raw survey input data (e.g., $SID_1, SID_2, \ldots, SID_N$) and the evaluative data input by the raters (e.g., $TID_1, TID_2, \ldots, TID_N$) to be the overall raw data for the surveys during an unsupervised learning stage characterized by imbalanced classification where it is possible to utilize one or more machine learning algorithms (e.g., principle components algorithm, a regression analysis algorithm, a means algorithm, a nearest neighbor algorithm, etc.), (v) providing the raw data of the surveys for processing by the machine learning algorithms, (vi) creating domains of question sets for the SIDs in which each SID is taken as a unit with its question set grouping, and denoted by domain number (e.g., $D_1, D_2, \ldots, D_N$), (vii) creating traits from the question set groupings of the domains, (viii) associating the domains and traits with a same numeric subscript value (e.g., $T_1, T_2, \ldots, T_N$) during either a supervised or a semi-supervised learning stage, (ix) looking at the domains as a set, looking at the traits individually, and looking for connections via one or more of the machine learning algorithms, (x) performing one or more of the machine learning algorithms on the traits, (xi) calculating the traits into meta-factors, (xii) determining the quality of leadership behaviors for the participant, and (xiii) determining whether the participant would make a good leader or not based on a number of positive quality of leadership behaviors in which more positive quality of leadership behaviors is more indicative of good leadership potential by the participant.

In some embodiments, the leadership survey and trait identification ML process for determining whether employees are suitable for leadership roles provides steps to create, view, and train projects for assessing quality of leadership potential of participants. In some embodiments, the steps to create, view, and train projects for assessing quality of leadership potential of participants are accessed through several dashboard views comprising a monitoring dashboard, a project setup dashboard, a training dashboard, an analysis dashboard, and reporting views. In some embodiments, the monitoring dashboard provides views in which (i) a first view on site shows all active analysis with several options including at least a start/pause analysis option, a view statistics and reports option, and an add new project option, (ii) a new project view in which a user can view all assessment types and the user can select an assessment type of either multirater or individual assessment (self-assessment), and (iii) a filtering view whereby the user can filter by name if a multirater type or survey ID (SID) if individual assessment type. The monitoring dashboard also determines whether machine learning training is needed or not. In some embodiments, the project setup dashboard provides views in which (i) filtered data sets of surveys are displayed according to filter option (multirater by SID, self-assessment by token ID), and (ii) the user can add rating per existing fields. In some embodiments, the training dashboard (i) displays all possible assessment results based on the filtering from the project setup dashboard, thereby allowing individual selections and ratings to be applied to the individual selections and (ii) presents a view in which the user may select data points for analysis based on chart information that gives all traits and allows for multiple selections from the list and by individual questions response which allows for the multiple selection option. In some embodiments, the analysis dashboard (i) allows selection of the analysis method to be used based on whether it is a supervised learning, semi-supervised learning, or unsupervised learning, and (ii) enables selection of statistical method to use—both selection of the type of analysis (e.g., Bayesian, deep learning, neural network, dimensionality reduction, clustering, etc.) and selection of the method based on the type (e.g., for clustering, K-means, K-medians, expectation maximations, hierarchical clustering, etc.).

In some embodiments, the method for interacting with a system for identifying potential leaders in corporate roles configured to generate leadership surveys to use in identifying likelihood of high performance in candidates for leadership roles comprises (i) selecting, by a user interacting with the system, an option for what the user would like to do, (ii) receiving a selection of either a new estimate option, a saved estimations option, or a review past placements option based on the user's selection, (iii) when the selection is a new estimate option, inputting a name and a role for a participant, (iv) selecting one or more special requirements of the role, (v) receiving user's selection of a submission, (vi) generating a list of questions based on the user's input of role and special requirements for the role, (vii) visually outputting a questionnaire with the list of questions, (viii) generating a likelihood of high performance based on the user's input to the questionnaire, (ix) generating areas of development to monitor, and (x) enabling options for the user to save the estimate, calculate a return on investment (ROI), place the participant in the role, add the participant to a group, or start the process over.

As stated above, there are ongoing issues in the business world to decide the person to promote into leadership positions. This is in the broad sense, meaning any job that directs the actions of others. The biggest problem is having a more data based method of selection, as opposed to the more traditional intuitive methods most commonly used. The cost of poor selection is enormous and difficult to reconcile. Embodiments of the system for identifying potential leaders in corporate roles described in this specification solve such problems by taking a research base of high performance leadership behaviors and provide a short screening questionnaire to determine the likelihood of success for that person. The deep learning AI system will make it precise, short, and interactive. The system for identifying potential leaders in corporate roles will make those decisions more accurate and the results more profitable.

Embodiments of the system for identifying potential leaders in corporate roles described in this specification differ from and improve upon currently existing options. In particular, some embodiments differ because there currently is not an equivalent system on the market that is based on leadership behaviors and profiles. The majority are done with broad competency areas that are related to technical skills, and very light on the interpersonal aspects that drive leadership success.

In addition, some embodiments of the system for identifying potential leaders in corporate roles improve upon the currently existing options because the majority of existing, conventional leadership identification systems and techniques are done with broad competency areas that are related to technical skills, and very light on the interpersonal aspects that drive leadership success. These do not work as well because the results are disproportionately weighted towards technical skills and omit the leadership perspective. The leadership perspective is mostly left to a subjective factor of how much the selection team likes the person, or how similar to the existing leadership that person is perceived to be. This is called the "halo effect", in which people in selection roles tend to pick others who are the most like themselves. By contrast, the system for identifying potential leaders in corporate roles of the present disclosure is more comprehensive and detailed process that will produce performance predictors for employees being considered for leadership roles and will provide targeted feedback on key areas to develop, and the most pertinent areas to monitor. Furthermore, the system for identifying potential leaders in corporate roles of this specification provides a platform for interactive discussions and clarifications on specific performance areas, as well as reports on key trends in overall placement strategies made by a user.

The system for identifying potential leaders in corporate roles of the present disclosure may be comprised of the following elements. This list of possible constituent elements is intended to be exemplary only and it is not intended that this list be used to limit the system for identifying potential leaders in corporate roles of the present application to just these elements. Persons having ordinary skill in the art relevant to the present disclosure may understand there to be equivalent elements that may be substituted within the present disclosure without changing the essential function or operation of the system for identifying potential leaders in corporate roles.

1. Overall flow of the comprehensive and detailed process
2. A dashboard interface
3. A monitoring module
4. A monitoring dashboard tool to create a new project page
5. A training dashboard
6. An analysis dashboard
7. A reports dashboard
8. A semi-supervised page
9. Machine learning algorithms
10. Artificial intelligence (AI) interface The various elements of the system for identifying potential leaders in corporate roles of the present disclosure may be related in the following exemplary fashion. It is not intended to limit the scope or nature of the relationships between the various elements and the following examples are presented as illustrative examples only. In some embodiments, the system for identifying potential leaders in corporate roles of the present disclosure includes additional non-user interface (UI) components, including a database of historical performance profiles, an initial set of algorithms and groups based on leadership research, a private web training interface that supports three distinct deep learning processes: (1) a supervised learning system based on the historical profiles, (2) a semi-supervised learning system for fine tuning the algorithms, and (3) an unsupervised learning system to find the deeper clusters of data and the highest weighting behaviors. These three system elements improve accuracy and completeness of the model for the system for identifying potential leaders in corporate roles. In addition, the system for identifying potential leaders in corporate roles includes a public web interface for users to input and analyze potential leaders. Together, all of these will provide the primary ingredients of the system for identifying potential leaders in corporate roles including, without limitation, the correct algorithms for proper data analysis, accurate weightings for each performance factor, a chatbot interface for users, and leadership performance ontology for the chatbot.

In some embodiments, the accuracy of the AI model (as presented via an AI interface) will be determined by how much clean and validated data we put through the system for identifying potential leaders in corporate roles.

In some embodiments, the assessment data used by the system for identifying potential leaders in corporate roles continually grows, with a trained team of professionals validating the assessment data, and testing the responses of the AI system. In some embodiments, the database of historical performance profiles will provide this, as well as a feedback system to externally rank these profiles.

In some embodiments, the private web interface is a key element of the system for identifying potential leaders in corporate roles, with key inputs that will then trigger the machine learning algorithms. In some embodiments, the machine learning algorithms will produce output and predictive data that allows the system for identifying potential leaders in corporate roles to work effectively. In some embodiments, the process is continually learning from the supervised database of historical performance profiles, as that database grows, and learning from the feedback of the users who are developing their employees for leadership roles.

Figure 3:
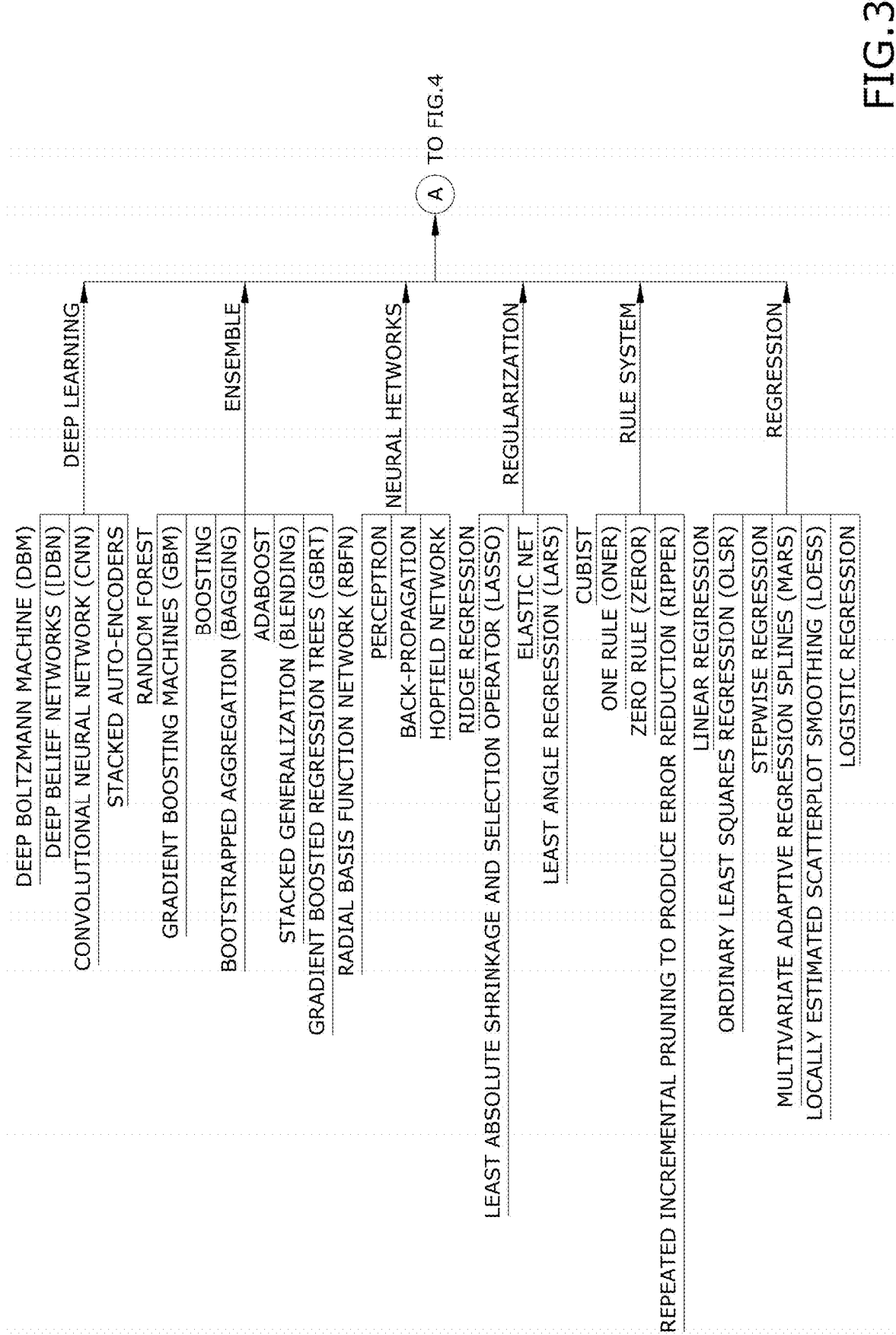
FIG. 3 conceptually illustrates a flow chart diagram of ML algorithms used by the system in performing the overall foundation of learning process and the leadership survey and trait identification ML process in some embodiments.
Figure 4:
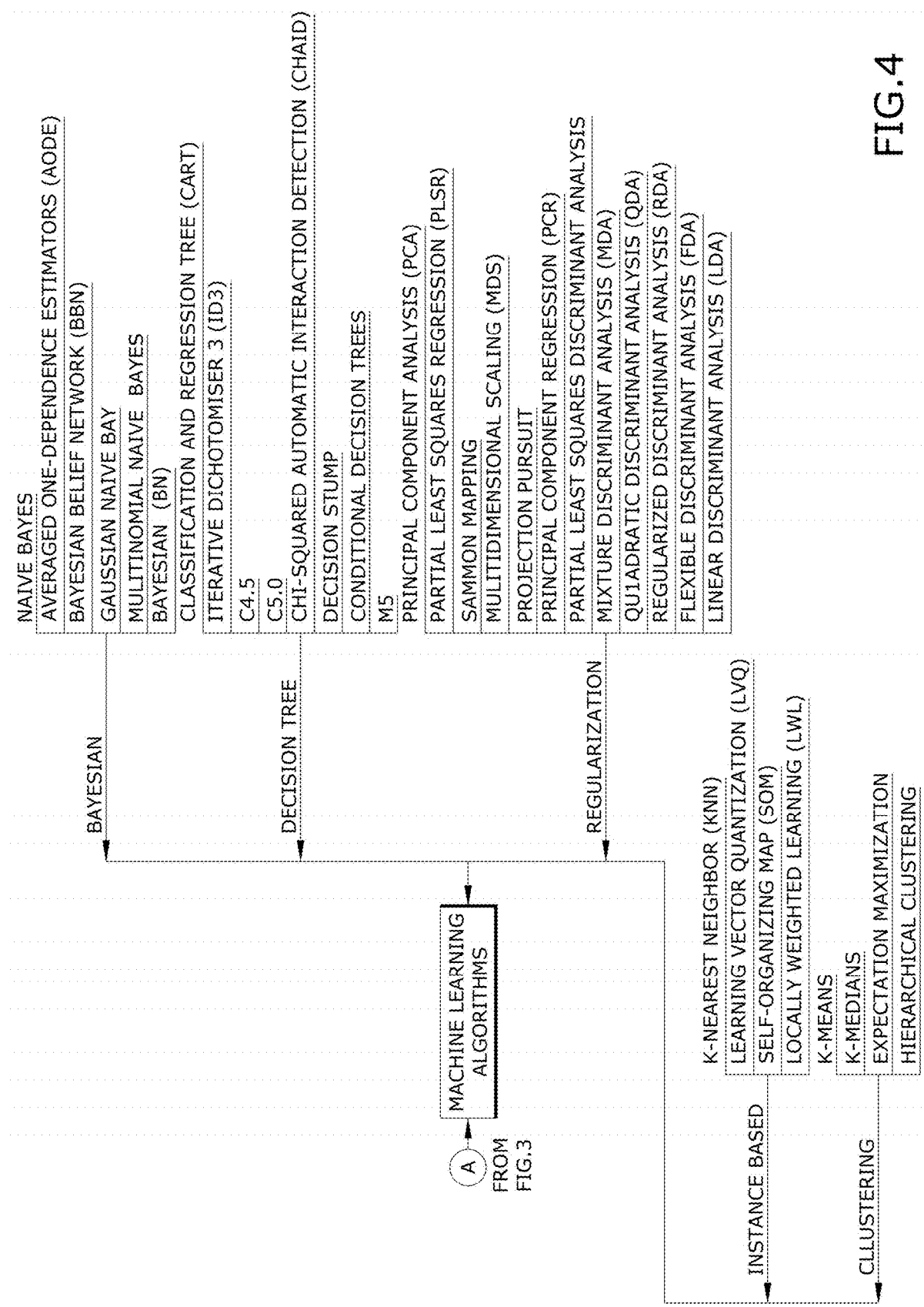
FIG. 4 conceptually illustrates a continuation of the flow chart diagram of ML algorithms shown in FIG. 3.

In some embodiments, the public web interface of the system for identifying potential leaders in corporate roles provides the ongoing testing and validation from the user perspective. The system for identifying potential leaders in corporate roles is designed to be accurate, dynamic, and easy to use. Overall logic of the system for identifying potential leaders in corporate roles is demonstrated and described below, by reference to FIGS. 1-6. The overall logic, thus, includes reading the historical data, with expert validation, and then it begins to create the neural networks. In some embodiments, interaction with the data continually refines the correct machine learning algorithms to use in order properly train the system for identifying potential leaders in corporate roles. Examples of the machine learning algorithms that are often utilized are described in a flow chart diagram of ML algorithms used by the system in performing the overall foundation of learning process and the leadership survey and trait identification ML process below, by reference to FIGS. 3 and 4. In some embodiments, the ML algorithms demonstrated in the flow chart diagram in FIGS. 3 and 4 allow for selection of the proper set of algorithms, as well as determination of the neural network of traits involved in determining a "good" leader, and their associated weights. The system provides several user interfaces through which a user can drive different approaches to the analysis. Specifically, the user interfaces are configured to enable the user to take any of multiple analysis approaches. These are created, simultaneously, in order to derive the core set of characteristics of good leaders. In some embodiments, the system for identifying potential leaders in corporate roles is flexible enough to monitor the performance of each, and build the system for identifying potential leaders in corporate roles in a way in which analytics can be refined as well as to add more data to the process. Other interfaces include, without limitation, interfaces for creating new deep learning routines, an overall monitoring interface (or page) of all active deep learning routines, an interface that shows the output (again on the private web site) of the semi-supervised learning routines (which would benefit from expert feedback on the accuracy of the prediction made by the AI), an overall categorization interface for categorization of machine learning algorithms that will be available to use in the process, a basic public web interface which demonstrates how a user would be able to interact and engage with the system for identifying potential leaders in corporate roles, as well as interface with the chatbot, and those to provide performance validation, and many more.

The system for identifying potential leaders in corporate roles of the present disclosure generally works with data, but the historical database is part of a separate system that generates large amounts of survey data on leadership behaviors. This includes extensive research based domains and traits, that are part of a more detailed assessment process. In some embodiments, the AI system reads these data, and provides an input area to add validation about externally observed data to make for an accurate training system. Also, the AI system, through its series of algorithms, continually creates weighted calculations that fit the data in the training database. From there, it reads the rest of the database, and using those calculations and weightings, makes predication of other leader performance. This semi-supervised system is ensures that the AI system can make accurate predictions. On the other hand, the unsupervised learning system is running on all patterns in the database, looking for critical correlations and the minimum possible traits for accurate predication.

To make the system for identifying potential leaders in corporate roles of the present disclosure, the system may begin with a Django based server, with Python essential libraries installed. These can be used out-of-the-box and provide a stable and proven platform for the deep learning. From there, the many database connections are made that provide access to the existing database, as well as tables to provide the performance validation. From there, the analytical system is constructed, per the drawing provided earlier, to determine the most appropriate algorithms and machine learning techniques. The feedback system requires a way to evaluate the results from multiple methods in order to get valid data. In some embodiments, the main level of construction, after all of the systems are configured, is matching the proper data systems with the algorithms, and establishing the feedback and neural network required to provide predictions. In some embodiments, the system for identifying potential leaders in corporate roles adds one or more natural language processing (NLP) modules to provide a more full featured interaction. Additionally, the system for identifying potential leaders in corporate roles of some embodiments further includes speech recognition and interaction to provide a more guided and personal experience. Furthermore, the system for identifying potential leaders in corporate roles of some embodiments can be adapted for use in connection with many different ways of making predictions by connecting it to a different data source. Examples of other ways in which the system for identifying potential leaders in corporate roles could be used include, without limitation, biotech, medical, and other related fields. Additionally, the components of the system for identifying potential leaders in corporate roles could be reconfigured to produce a far more situational interaction with the users, through which they can provide scenarios and get feedback and predictions.

To use the system for identifying potential leaders in corporate roles of the present disclosure, reference is made to the core of the user process, which involves working through a web interface. Here, the user inputs the name and role of a person whom they are considering for a leadership role. The system will ask some basic question about the role, then will enter a short online questionnaire about the person under consideration. Then, upon completion and submission, the system for identifying potential leaders in corporate roles will generate a plot of the likelihood of success for that person. Additionally, the system for identifying potential leaders in corporate roles of some embodiments will provide the top three items to watch if they choose to move this person into a leadership role. The user is allowed to save, discard, or indicate that they have placed the person in question. From there, the system for identifying potential leaders in corporate roles will regularly offer items to monitor for that person, and will ask for specific observation feedback. This will improve the accuracy of the program with every iteration.

Additionally, the system for identifying potential leaders in corporate roles could be used in hiring and outplacement services. Additionally, any situation where results can be predicted based on behavioral observation present possible adaptations and uses of the system for identifying potential leaders in corporate roles.

By way of example, FIG. 1 conceptually illustrates an overall foundation of learning process 100 for identifying potential leaders in corporate roles in some embodiments. As shown in this figure, the overall foundation of learning process 100 for identifying potential leaders in corporate roles starts by a user (or multiple users) inputting data (at 110) into the system. The users are participants, or potential leaders. In some embodiments, the user(s) input data to a survey or to multiple different surveys. In some embodiments, the overall foundation of learning process 100 uniquely associates each user with a survey identification (or survey ID). The survey ID is denoted (at 120) in the overall foundation of learning process 100 by the acronym 'SID' (survey ID) with subscript number (e.g., $SID_1$, $SID_2$, ..., $SID_N$). Additionally, each survey has raters who input evaluative data, and the overall foundation of learning process 100 for identifying potential leaders in corporate roles associates the evaluative data input by each rater with a unique token ID (at 130). The unique token ID is denoted by the acronym 'TID' (token ID) with subscript number (e.g., $TID_1$, $TID_2$, ..., $TID_N$). Generally, the SID and TID correspond in subscript number. For instance, $SID_1$ corresponds to $TID_1$, $SID_2$ corresponds to $TID_2$, and $SID_N$ corresponds to $TID_N$. Together, the raw survey input data (e.g., $SID_1$, $SID_2$, ..., $SID_N$) and the evaluative data input by the raters (e.g., $TID_1$, $TID_2$, ..., $TID_N$) are considered by the overall foundation of learning process 100 for identifying potential leaders in corporate roles to be the overall raw data for the surveys (at 135). Also, the overall foundation of learning process 100 for identifying potential leaders in corporate roles is only in an unsupervised learning stage at this point. Specifically, the unsupervised learning stage is characterized by imbalanced classification where it is possible to utilize one or more machine learning algorithms. Examples of the algorithms utilized at this stage include, without limitation, a principle components algorithm, a regression analysis algorithm, a means algorithm, a nearest neighbor algorithm, etc. The types of machine learning algorithms utilized by the system are described below, by reference to FIGS. 3-4.

In some embodiments, the overall foundation of learning process 100 for identifying potential leaders in corporate roles then provides the raw data of the surveys for processing by the machine learning algorithms (at 140). As noted above, several exemplary machine learning algorithms are described below, by reference to FIGS. 3-4. After processing by the algorithms (at 140), the overall foundation of learning process 100 for identifying potential leaders in corporate roles creates domains (at 150) of question sets for the SIDs. That is, each SID is taken as a unit with its question set grouping, and denoted by domain number (e.g., $D_1$, $D_2$, ..., $D_N$). From the question set groupings of the domains (e.g., $D_1$, $D_2$, ..., $D_N$), the overall foundation of learning process 100 for identifying potential leaders in corporate roles creates traits (at 160). In some embodiments, the overall foundation of learning process 100 for identifying potential leaders in corporate roles associated the domains and traits (at 165) by denoting traits corresponding to the domains with a same numeric subscript value (e.g., $T_1$, $T_2$, ..., $T_N$). Additionally, at this stage, the overall foundation of learning process 100 for identifying potential leaders in corporate roles is in either a supervised or semi-supervised learning stage. During either the supervised or semi-supervised learning stage, the overall foundation of learning process 100 for identifying potential leaders in corporate roles looks at the domains as a set, looks at the traits individually, and looks for connections via one or more of the machine learning algorithms. For instance, looking for connections as in a Bayesian network.

When looking at these traits and looking for such connections, the overall foundation of learning process 100 for identifying potential leaders in corporate roles of some embodiments performs one or more of the machine learning algorithms on the traits (at 170). Next, the overall foundation of learning process 100 for identifying potential leaders in corporate roles calculates the traits into meta-factors (at 180). From the resulting data, the overall foundation of learning process 100 for identifying potential leaders in corporate roles determines (at 190) the quality of leadership behaviors for the participant. In this way, the overall foundation of learning process 100 for identifying potential leaders in corporate roles is able to determine whether the participant would make a good leader or not.

In some embodiments, the machine learning algorithms are utilized with certain intentions and hypotheses. For instance, the machine learning utilized by the system is designed from and understood to operate on a basis of a model in which $Y=f(x)$. Thus, positive traits indicate a participant exhibits characteristics of good leadership, and the more positive traits exhibited by the participant, the stronger the indication of good leadership potential for the participant. As a result, organization performance is likely higher for those participants who exhibit high frequencies of positive traits in comparison with other leaders who exhibit lower frequencies of positive traits. Also, organization performance may be impacted by the participant's personal blind spot(s) but compensation can be indicated to account for social intelligence coupled with self-awareness, or other personal insights, as well as their consistency in exhibiting these behaviors, but which is limited by any demonstrated derailing behaviors.

For instance, each participant (or leader) may be identified by the SID unique identifier, with weighting made accordingly (W=weight), trait included (X=T), and Y evaluated to L+ indicated a good leader. A way to exemplify this is by a reduction to a formula: $L+=(T_1W_1)+(T_NW_N)$. Note, weights are normally set to weight across the board, despite the real possibility of inequality. Nevertheless, the weighting can be set as needed. Also, all set, TIDs, domains, traits, and metafactors are imbalanced classifications.

Figure 2:
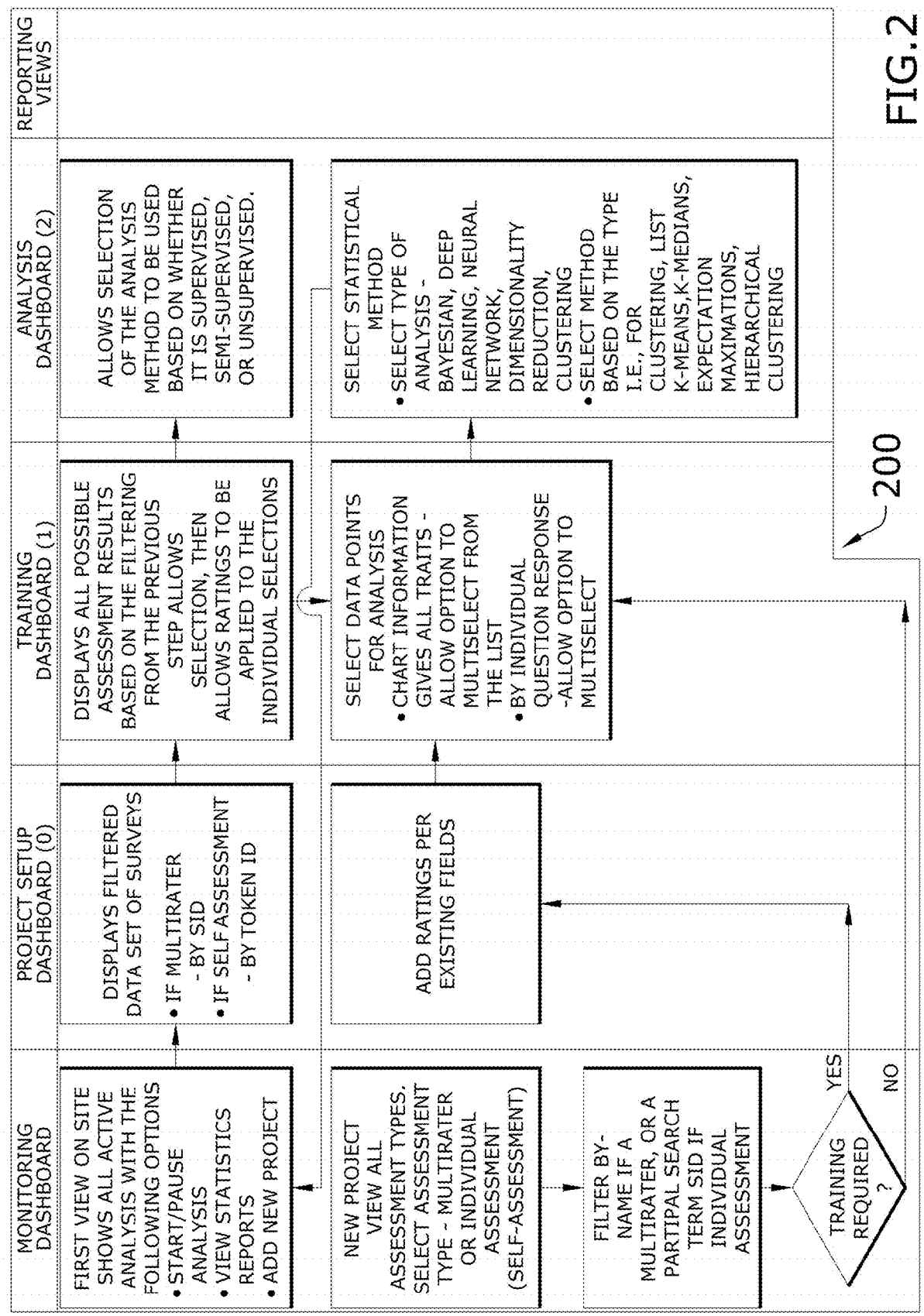
FIG. 2 conceptually illustrates a leadership survey and trait identification machine learning ("ML") process for determining whether employees are suitable for leadership roles in some embodiments.

By way of another example, FIG. 2 conceptually illustrates a leadership survey and trait identification machine learning ("ML") process 200 for determining whether employees are suitable for leadership roles in some embodiments.

As shown in this figure, the leadership survey and trait identification ML process 200 demonstrates steps in several dashboard views of a software program that implements the leadership survey and trait identification ML process 200 for determining whether employees are suitable for leadership roles. The dashboard views shown include a monitoring dashboard, a project setup dashboard, a training dashboard, and an analysis dashboard. Thus, for example from the monitoring dashboard, the leadership survey and trait identification ML process 200 demonstrates a step in which the first view on site shows all active analysis with certain options, such as an option to start/pause the analysis, an option to view statistics and reports, and an option to add a new project.

From the project setup dashboard, the leadership survey and trait identification ML process 200 demonstrates a step for displaying a filtered data set of surveys. If data sets are filtered for multiple raters, then filter by SID. If data sets filtered for self-assessment, then by token ID (TID).

From the training dashboard, the leadership survey and trait identification ML process 200 demonstrates a step for displaying all possible assessment results based on the filtering from the previous step (in the project setup dashboard). This allows selection and then allows ratings to be applied to the individual selections. The leadership survey and trait identification ML process 200 for determining whether employees are suitable for leadership roles can transition from the training dashboard to either or both of the analysis dashboard or another option within the training dashboard. Specifically, the analysis dashboard allows selection of the analysis method to be used based on whether the learning is supervised, semi-supervised, or unsupervised.

In the training dashboard, the user may select data points for analysis. In particular, a chart is displayed in which chart information gives a list of all the traits and allows the user the ability to multi-select from the list of traits. Similarly, the data points may be selected based on individual question response, with the option to multi-select from the individual responses.

Then leadership survey and trait identification ML process 200 for determining whether employees are suitable for leadership roles transitions back to the analysis dashboard.

In the analysis dashboard, the leadership survey and trait identification ML process 200 provides for a selection of a statistical method. Specifically, the user selects a type of analysis, such as Bayesian, deep learning, neural network, dimensionality reduction, clustering. Then the leadership survey and trait identification ML process 200 allows the user to select a method based on the type (i.e., for clustering, methods such K-means, K-medians, expectation, maximations, hierarchical clustering. Then the leadership survey and trait identification ML process 200 returns to the monitoring dashboard view noted above.

In some embodiments, the monitoring dashboard provides a new project view in which the user can view all assessment types. The user can also select an assessment type for a new project (or survey) in which the selection is either an individual assessment (or self-assessment) or multi-rater assessment. Then the leadership survey and trait identification ML process 200 provides another view in the monitoring dashboard for filtering. The user can filter by name if it is a multi-rater type, or by participant search term, SID if individual assessment. Then the leadership survey and trait identification ML process 200 determines whether training is required or not. When training is required, the leadership survey and trait identification ML process 200 flows back to the project setup dashboard to show a view for adding ratings per existing fields. On the other hand, when training is not required, the leadership survey and trait identification ML process 200 displays the training dashboard view to select the data points for analysis, as described above.

As mentioned above, the system utilizes several machine learning algorithms. By way of example, FIGS. 3 and 4 conceptually illustrate a flow chart diagram of several machine learning algorithms used by the system in performing the overall foundation of learning process and the leadership survey and trait identification ML process in some embodiments.

Figure 5:
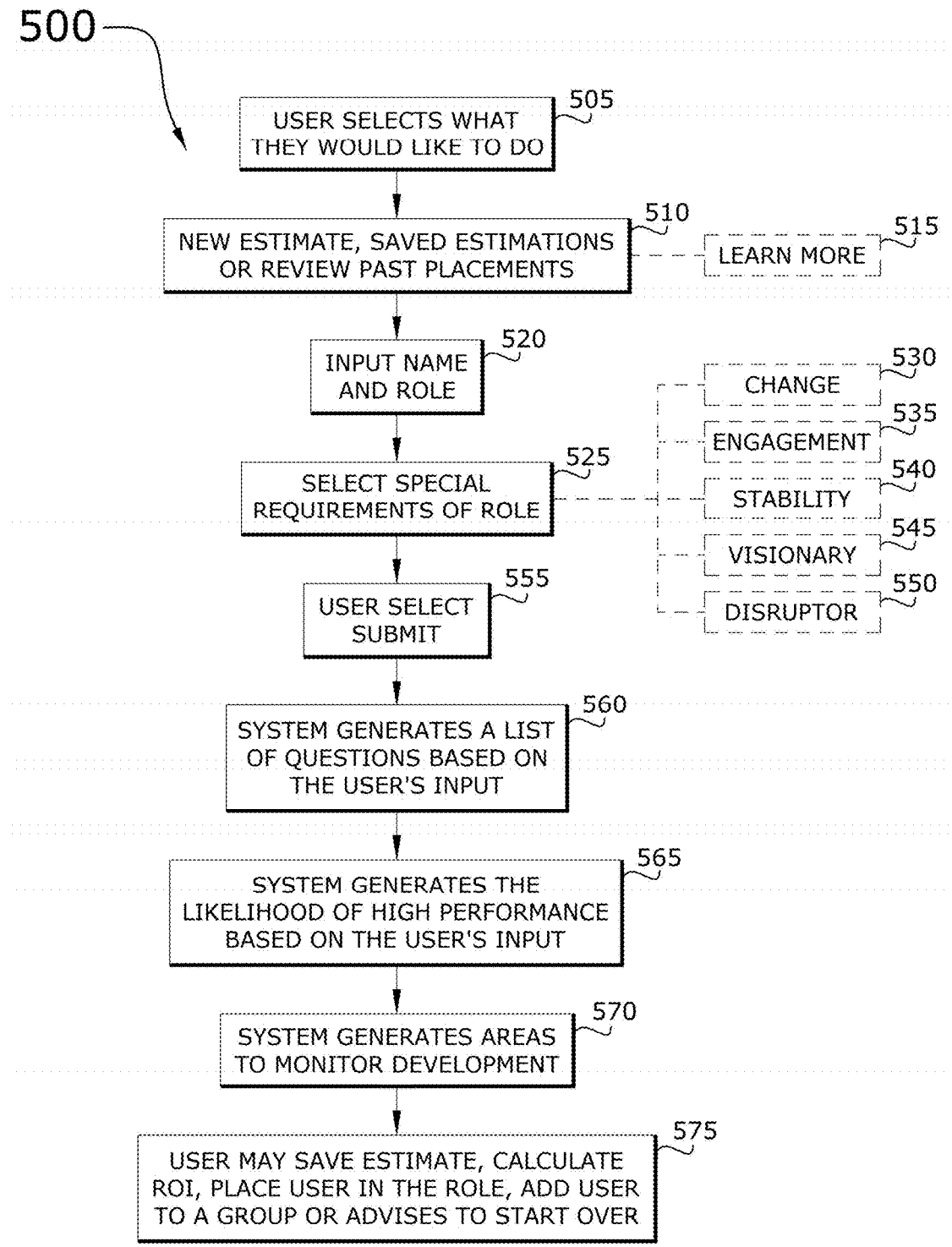
FIG. 5 conceptually illustrates a method for interacting with a system for identifying potential leaders in corporate roles configured to generate leadership surveys to use in identifying likelihood of high performance in candidates for leadership roles in some embodiments.

Turning now to another example, FIG. 5 conceptually illustrates a method for interacting with a system for identifying potential leaders in corporate roles configured to generate leadership surveys to use in identifying likelihood of high performance in candidates for leadership roles 500. The method for interacting with a system for identifying potential leaders in corporate roles configured to generate leadership surveys to use in identifying likelihood of high performance in candidates for leadership roles 500 shown in this figure is variously described by reference to FIG. 6, which conceptually illustrates a stage diagram of a user interface for interacting with a system for identifying potential leaders in corporate roles configured to generate leadership surveys to use in identifying likelihood of high performance in candidates for leadership roles 600.

Starting with FIG. 5, the method for interacting with the system for identifying potential leaders in corporate roles configured to generate leadership surveys to use in identifying likelihood of high performance in candidates for leadership roles 500 starts when a user selects an option for what they would like to do (at 505).

In some embodiments, the method for interacting with the system for identifying potential leaders in corporate roles configured to generate leadership surveys to use in identifying likelihood of high performance in candidates for leadership roles 500 provides (at 510) the options as user interface tools that appear as selectable buttons for 'new estimate', 'saved estimations', and 'review past placements'.

In some embodiments, the method for interacting with the system for identifying potential leaders in corporate roles configured to generate leadership surveys to use in identifying likelihood of high performance in candidates for leadership roles 500 also provides an optional steps for learning more about what they would like to do (at 515) or the top areas for development, as described next.

Figure 6:
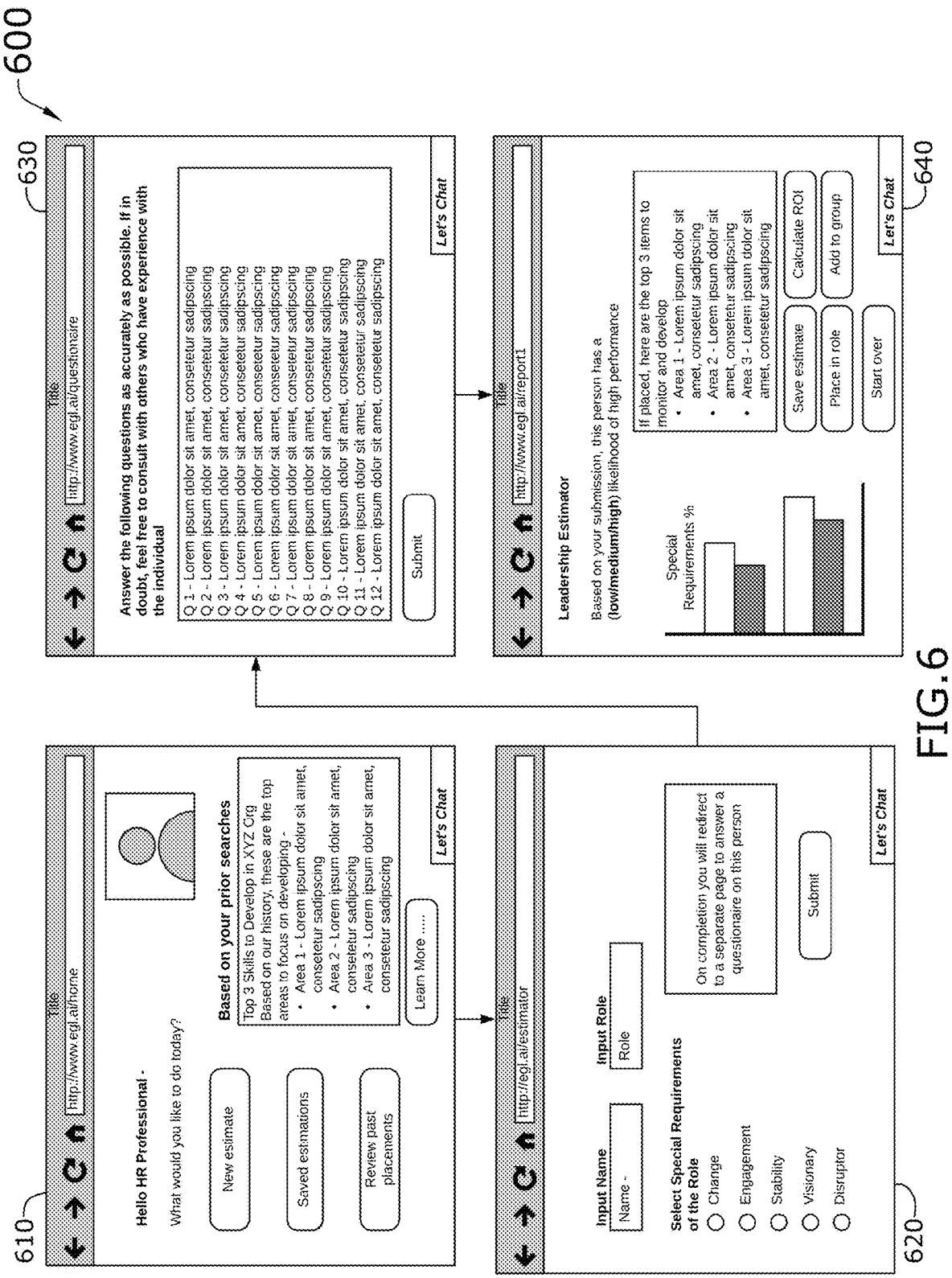
FIG. 6 conceptually illustrates a stage diagram of a user interface for interacting with a system for identifying potential leaders in corporate roles configured to generate leadership surveys to use in identifying likelihood of high performance in candidates for leadership roles in some embodiments.

Turning to the stage diagram of a user interface for interacting with a system for identifying potential leaders in corporate roles configured to generate leadership surveys to use in identifying likelihood of high performance in candidates for leadership roles 600 in FIG. 6, a first stage 610 demonstrates a user interface with several options for the user to select. Specifically, a 'New estimate' button, a 'Saved estimations' button, and a 'Review past placements' button. Also show in the user interface in the first stage 610 is a window with information based on prior searches, with the information indicating the top three skills to develop in an organization based on the historical record. Another button in the user interface shown in the first stage 610 is an optional 'Learn more' button.

When the user selects the option for a 'New estimate', they will proceed to complete several data input fields for information. Thus, turning back to FIG. 5, the method for interacting with the system for identifying potential leaders in corporate roles configured to generate leadership surveys to use in identifying likelihood of high performance in candidates for leadership roles 500 of some embodiments continues forward to a step for inputting the name and role (at 520) and selecting special requirements or the role (at 525) if any. The special roles include a change role (at 530), an engagement role (at 535), a stability role (at 540), a visionary role (at 545), and a disruptor role (at 550). Next, the method for interacting with a system for identifying potential leaders in corporate roles configured to generate leadership surveys to use in identifying likelihood of high performance in candidates for leadership roles 500 continues to a step in which the user selects to submit (at 555).

Now returning to the stage diagram of the user interface for interacting with the system for identifying potential leaders in corporate roles configured to generate leadership surveys to use in identifying likelihood of high performance in candidates for leadership roles 600 of FIG. 6, a second stage 620 is shown in which another user interface view provides input fields for a name and a role, a plurality of user-selectable radio buttons for special requirements of the role (namely, change, engagement, stability, visionary, and disruptor), some information, and a submit button to proceed forward to the questionnaire about the participant.

Referring again to FIG. 5, the method for interacting with the system for identifying potential leaders in corporate roles configured to generate leadership surveys to use in identifying likelihood of high performance in candidates for leadership roles 500 generates a list of questions (at 560) based on the user's input of name, role, and special requirements, if any. This is shown by reference to FIG. 6, in a third stage 630 with several exemplary questions and a submit button the user selects upon completion of the questionnaire about the person.

Upon selection of the submit button (and turning back to FIG. 5), the method for interacting with the system for identifying potential leaders in corporate roles configured to generate leadership surveys to use in identifying likelihood of high performance in candidates for leadership roles 500 generates a likelihood of high performance for the participant (at 565) based on the user's input (or answers to the questions in the questionnaire). In some embodiments, the method for interacting with the system for identifying potential leaders in corporate roles configured to generate leadership surveys to use in identifying likelihood of high performance in candidates for leadership roles 500 also generates one or more areas to monitor for development (at 570).

Finally, the method for interacting with the system for identifying potential leaders in corporate roles configured to generate leadership surveys to use in identifying likelihood of high performance in candidates for leadership roles 500 proceeds to a step for allowing the user to save the estimate, calculate a return on investment (ROI), place the user in the role, add the user to a group, and/or start the process over (at 575). Then the method for interacting with a system for identifying potential leaders in corporate roles configured to generate leadership surveys to use in identifying likelihood of high performance in candidates for leadership roles 500 ends.

Turning back to FIG. 6, the stage diagram of the user interface for interacting with the system for identifying potential leaders in corporate roles configured to generate leadership surveys to use in identifying likelihood of high performance in candidates for leadership roles 600 shown a fourth stage 640 in which a leadership estimation is provided, with graphs for exhibited behaviors demonstrating various user-selected special requirements for the role, and a determination of the likelihood of high performance by the participant, along with areas for development. In addition, several user-selectable options (buttons) are shown for saving the estimate, calculating the ROI, placing in the role, adding to a group, and/or starting over.

The above-described embodiments of the invention are presented for purposes of illustration and not of limitation. Also, many of the above-described features and applications are implemented as software processes that are specified as a set of instructions recorded on a computer readable storage medium (also referred to as computer readable medium, machine readable medium, or non-transitory computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
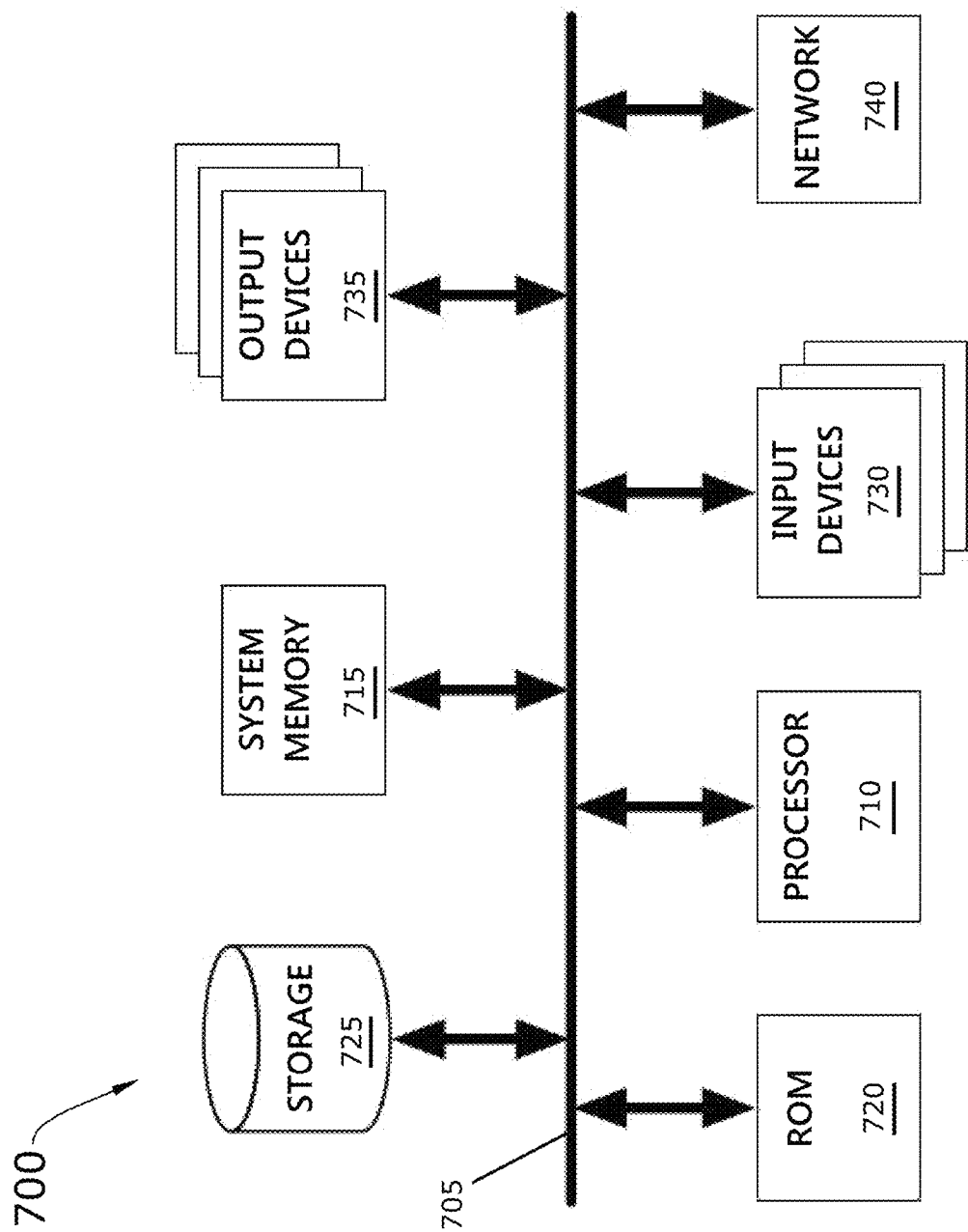
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer, phone, PDA, or any other sort of electronic device. Such an electronic system includes various types of computer readable media and interfaces for various other types of computer readable media. Electronic system 700 includes a bus 705, processing unit(s) 710, a system memory 715, a read-only memory 720, a permanent storage device 725, input devices 730, output devices 735, and a network 740.

The bus 705 collectively represents all system, peripheral, and chipset buses that communicatively connect the numerous internal devices of the electronic system 700. For instance, the bus 705 communicatively connects the processing unit(s) 710 with the read-only memory 720, the system memory 715, and the permanent storage device 725.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device 725. Like the permanent storage device 725, the system memory 715 is a read-and-write memory device. However, unlike storage device 725, the system memory 715 is a volatile read-and-write memory, such as a random access memory. The system memory 715 stores some of the instructions and data that the processor needs at runtime. In some embodiments, the invention's processes are stored in the system memory 715, the permanent storage device 725, and/or the read-only memory 720. For example, the various memory units include instructions for processing appearance alterations of displayable characters in accordance with some embodiments. From these various memory units, the processing unit(s) 710 retrieves instructions to execute and data to process in order to execute the processes of some embodiments.

The bus 705 also connects to the input and output devices 730 and 735. The input devices enable the user to communicate information and select commands to the electronic system. The input devices 730 include alphanumeric keyboards and pointing devices (also called "cursor control devices"). The output devices 735 display images generated by the electronic system 700. The output devices 735 include printers and display devices, such as liquid crystal displays (LCD) and organic light emitting diode (OLED) displays. Some embodiments include devices such as a touchscreen that functions as both input and output devices.

Finally, as shown in FIG. 7, bus 705 also couples electronic system 700 to a network 740 through a network adapter (not shown). In this manner, the computer can be a part of a network of computers (such as a local area network ("LAN"), a wide area network ("WAN"), or an intranet), or a network of networks (such as the Internet). Any or all components of electronic system 700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-5 conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. An overall foundation of learning process for identifying potential leaders in corporate roles comprising:
receiving, at a public web site interface and through a plurality of chatbot interfaces of the public web site interface, data input by a plurality of users;
uniquely associating each user with a survey identification (SID) and a user sub script number;
receiving, at the public web site interface, evaluative data input by a plurality of raters;
associating the evaluative data input by each rater with a unique token ID (TID) and a rater subscript number;
characterizing, through an artificial intelligence (AI) interface that is communicably connected to a model of an AI system, the data input received from the plurality of users and the evaluative data input received from the plurality of raters as raw survey input data during an unsupervised machine learning stage an unsupervised learning system characterized by imbalanced classification which allows for utilization of a plurality of machine learning algorithms comprising a first deep learning algorithm and a second deep learning algorithm, wherein the unsupervised learning system is configured to find deeper clusters of data and highest weighting behaviors during the unsupervised machine learning stage;
providing, to an unsupervised learning system through the AI interface, the raw survey input data for processing by the plurality of machine learning algorithms;
creating domains of questions as a question set grouping for each SID, wherein each SID is taken as a unit with its question set grouping;
denoting each domain of questions by a domain number corresponding to the SID;
creating traits based on each domain of questions from the question set groupings of the domains;
associating the domains and the traits with a same numeric subscript value during (i) a supervised learning stage of a supervised learning system that is configured to train the model of the AI system through a private web training interface that is configured to perform a first deep learning process that is associated with the first deep learning algorithm and analyzes the historical profiles retrieved from a database of historical performance profiles and (ii) a semi-supervised learning stage of a semi-supervised learning system that is configured to train the model of the AI system through the private web training interface to perform a second deep learning process that is associated with the second deep learning algorithm that is configured to fine tune the plurality of machine learning algorithms based on leadership research;
organizing, in a monitoring dashboard, and looking at, in an analysis dashboard, the domains as a set of domains;
organizing, in the monitoring dashboard, and looking at, in the analysis dashboard, the traits as separate, individual traits;
identifying connections between the set of domains and the individual traits by the plurality of machine learning algorithms;
performing the plurality of the machine learning algorithms on the traits;
calculating the traits into meta-factors; and
determining whether each user would make a good leader.

2. The overall foundation of learning process of claim 1, wherein the users comprise one or more of participants, potential leaders, and candidates.

3. The overall foundation of learning process of claim 1, wherein the SID and the TID correspond to each other when the user subscript number of the SID equals the rater subscript number of the TID.

4. The overall foundation of learning process of claim 1, wherein the plurality of machine learning algorithms further comprise at least one of a principle components algorithm, a regression analysis algorithm, a means algorithm, and a nearest neighbor algorithm.

5. The overall foundation of learning process of claim 1 further comprising determining quality of leadership behaviors for each user.

6. The overall foundation of learning process of claim 5, wherein determining whether each user would make a good leader is based on a number of positive quality of leadership behaviors.

7. The overall foundation of learning process of claim 6, wherein a first number of positive quality of leadership behaviors is associated with a first user and a second number of positive quality of leadership behaviors is associated with a second user.

8. The overall foundation of learning process of claim 7, wherein the second number is greater than the first number.

9. The overall foundation of learning process of claim 8, wherein the greater second number of positive quality of leadership behaviors associated with the second user indicates good leadership potential by the second user.

\* \* \* \* \*